US010214385B2

(12) United States Patent
Eastman et al.

(10) Patent No.: US 10,214,385 B2
(45) Date of Patent: Feb. 26, 2019

(54) ELEVATOR BRAKE WEDGE

(71) Applicant: Otis Elevator Company, Farmington, CT (US)

(72) Inventors: Scott Alan Eastman, Glastonbury, CT (US); Brad Guilani, Woodstock Valley, CT (US); Chen Qian Zhao, Newark, DE (US); Randall S. Dube, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/415,378

(22) Filed: Jan. 25, 2017

(65) Prior Publication Data

US 2018/0208434 A1 Jul. 26, 2018

(51) Int. Cl.
| *F16D 69/00* | (2006.01) |
| *B66B 5/22* | (2006.01) |
| *B22D 25/02* | (2006.01) |
| *B33Y 10/00* | (2015.01) |
| *B33Y 80/00* | (2015.01) |
| *B29C 45/14* | (2006.01) |
| *B29C 43/18* | (2006.01) |
| *B29K 705/00* | (2006.01) |
| *B29L 31/16* | (2006.01) |

(52) U.S. Cl.
CPC .............. *B66B 5/22* (2013.01); *B22D 25/02* (2013.01); *B29C 43/18* (2013.01); *B29C 45/14* (2013.01); *B33Y 10/00* (2014.12); *B33Y 80/00* (2014.12); *B29K 2705/00* (2013.01); *B29L 2031/16* (2013.01)

(58) Field of Classification Search
CPC ........... B66B 5/22; B33Y 10/00; B33Y 80/00; B22D 25/02; B29C 43/18; B29C 45/14
See application file for complete search history.

(56) References Cited

U.S. PATENT DOCUMENTS

| 2,326,046 A | 8/1943 | McCormick |
| 3,762,512 A | 10/1973 | Mc |
| 5,096,020 A | 3/1992 | Korhonen |
| 5,503,257 A * | 4/1996 | Sugita ...................... B66B 5/18 |
| | | 188/250 B |

(Continued)

FOREIGN PATENT DOCUMENTS

| CN | 2685301 Y | 3/2005 |
| CN | 1608970 A | 4/2005 |

(Continued)

OTHER PUBLICATIONS

Search Report dated Jun. 4, 2018 in U320805EP, EP Application No. 18153153, 7 pages.

*Primary Examiner* — Michael A Riegelman
(74) *Attorney, Agent, or Firm* — Cantor Colburn LLP

(57) ABSTRACT

An elevator brake wedge is provided and includes an elongate body having first and second generally opposed major surfaces and first and second generally opposed minor surfaces. The second minor surface has a greater length than the first minor surface. Each of the first and second major surfaces extends between corresponding first and second ends of the first and second minor surfaces, respectively. The second major surface defines low-friction film securing grooves extending from a plane of the second major surface into the elongate body.

7 Claims, 4 Drawing Sheets

(56) References Cited

U.S. PATENT DOCUMENTS

| | | | |
|---|---|---|---|
| 5,782,319 A | | 7/1998 | Woodruff et al. |
| 5,964,320 A | * | 10/1999 | Kato .................... B66B 5/22 |
| | | | 187/375 |
| 5,964,322 A | * | 10/1999 | Thompson ............. B66B 5/22 |
| | | | 188/251 M |
| 5,979,615 A | * | 11/1999 | Thompson ............. B66B 5/18 |
| | | | 188/251 A |
| 6,318,507 B1 | | 11/2001 | Jin |
| 6,371,261 B1 | * | 4/2002 | Thompson ............. B66B 5/22 |
| | | | 187/370 |
| 6,378,670 B1 | * | 4/2002 | Kawakami ........... E04H 9/021 |
| | | | 188/251 A |
| 6,719,101 B2 | | 4/2004 | Hugel |
| 9,321,611 B2 | | 4/2016 | Wei |
| 2002/0125081 A1 | * | 9/2002 | Meyer ................. F16D 65/092 |
| | | | 188/73.1 |
| 2004/0134727 A1 | * | 7/2004 | Windlin ................ B66B 5/185 |
| | | | 188/250 R |
| 2015/0083533 A1 | * | 3/2015 | El-Wardany ........... B66B 5/22 |
| | | | 188/251 A |
| 2015/0292582 A1 | * | 10/2015 | El-Wardany ........... B66B 5/22 |
| | | | 188/250 G |
| 2016/0348745 A1 | * | 12/2016 | Leichtfried ........... F16D 69/04 |

FOREIGN PATENT DOCUMENTS

| | | |
|---|---|---|
| JP | S54173472 U | 12/1979 |
| JP | H11199159 A | 7/1999 |
| JP | H11217167 A | 8/1999 |
| JP | 2015034081 A | 2/2015 |
| KR | 20110130776 A | 12/2011 |
| WO | 2016100775 A1 | 6/2016 |

* cited by examiner

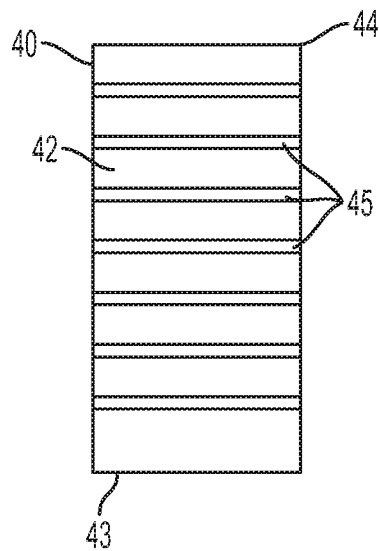
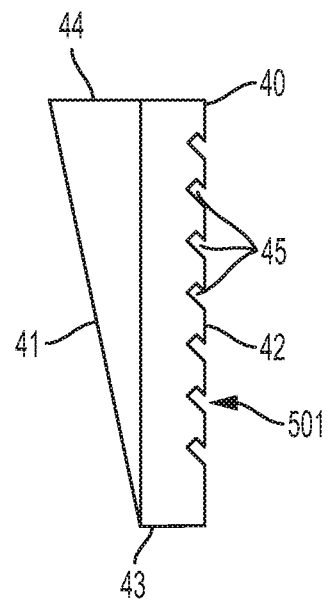
FIG. 5
FIG. 6
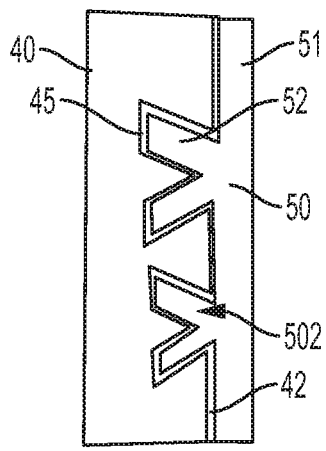
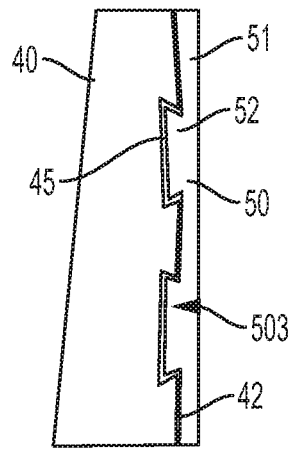
FIG. 7
FIG. 8

ELEVATOR BRAKE WEDGE

BACKGROUND

The following description relates to elevator brakes and, more particularly, to elevator brakes with elevator brake wedges having low-friction film supporting grooves.

Safety assemblies for certain elevators have a passive part and an active part that moves within the passive part. In some cases, the active part can be provided as wedges that move between non-braking and braking positions relative to a central rail and laterally positioned sliding guides. In order to operate correctly, the wedges need to be self-engaging and capable of disengagement and require a low friction guiding surface to facilitate movement along sliding guide surfaces to guarantee their respective engagement and disengagement with the rail when conditions dictate that the safety assembly be engaged and then disengaged.

Over time, however, it has been seen that the guiding surfaces of the wedges can have reliability and durability issues due to mechanical wear in particular without the introduction of preferential lower friction features to mitigate such conditions. While an industry solution has been to introduce a linear roller bearing assembly between the guiding surfaces of the wedges and sliding guides, the bearings are generally overly thick, complex and expensive. Another alternative has been to use a thin, low friction element (film) that is adhesive bonded to the wedge to provide the necessary low friction guiding surfaces of the wedge adjacent to the sliding guides. Durability of such films remains problematic though because the materials of the low friction guiding surfaces are inherently difficult to bond to the wedges or retain their bond strength during usage of the safety assemblies.

BRIEF DESCRIPTION

According to one aspect of the disclosure, an elevator brake wedge is provided and includes an elongate body having first and second generally opposed major surfaces and first and second generally opposed minor surfaces. The second minor surface has a greater length than the first minor surface. Each of the first and second major surfaces extends between corresponding first and second ends of the first and second minor surfaces, respectively. The second major surface defines low-friction film securing grooves extending from a plane of the second major surface into the elongate body.

In accordance with additional or alternative embodiments, the elongate body includes metallic materials or metallic alloys and the low-friction film securing grooves are receptive of low-friction film handles.

In accordance with additional or alternative embodiments, a material of the second major surface directly and non-adhesively contacts a material of a low-friction film.

In accordance with additional or alternative embodiments, each of the low-friction film securing grooves has an elongate shape.

In accordance with additional or alternative embodiments, a longitudinal axis of each of the low-friction film securing grooves is acutely angled relative to the plane of the second major surface and a corner of each of the low-friction film securing grooves is rounded.

In accordance with additional or alternative embodiments, each of the low-friction film securing grooves has a V-shape.

In accordance with additional or alternative embodiments, each of the low-friction film securing grooves has a tongue-in-flap shape.

In accordance with additional or alternative embodiments, each of the low-friction film securing grooves has a ball-in-shoulder shape.

In accordance with another aspect of the disclosure, an elevator brake is provided and includes first and second sliding guides supportable in a body on either side of a rail, first and second brake wedges and a low-friction film. The first and second brake wedges are configured to assume respective non-braking and braking positions in the body between the sides of the rail and the first and second sliding guides, respectively. Each of the first and second brake wedges includes a first major surface for engagement with the rail, a second major surface generally opposite the first major surface and formed to define grooves and a low-friction film. The low-friction film has handles which are receivable in the grooves to support the low-friction film at the second major surface for engagement with a corresponding one of the first and second sliding guides.

In accordance with additional or alternative embodiments, each of the first and second brake wedges further includes a first minor surface and a second minor surface generally opposed to and having a greater length than the first minor surface and the grooves extend from a plane of the second major surface toward a plane of the first major surface.

In accordance with additional or alternative embodiments, the first and second brake wedges include metallic materials or metallic alloys and the low-friction film includes at least one of filled or unfilled thermoplastic materials, filled or unfilled polymers, filled or unfilled thermoplastics and/or thermoset or epoxy materials with low friction additives.

In accordance with additional or alternative embodiments, a material of the second major surface directly and non-adhesively contacts a material of the low-friction film.

In accordance with additional or alternative embodiments, each of the grooves has an elongate shape and a longitudinal axis of each of the grooves is acutely angled relative to the plane of the second major surface and a corner of each of the grooves is rounded.

In accordance with additional or alternative embodiments, each of the grooves has a V-shape.

In accordance with additional or alternative embodiments, each of the grooves has a tongue-in-flap shape.

In accordance with additional or alternative embodiments, each of the grooves has a ball-in-shoulder shape.

According to yet another aspect of the disclosure, a method of forming an elevator brake wedge is provided. The method includes forming an elongate body having first and second generally opposed major surfaces and first and second generally opposed minor surfaces such that the second minor surface has a greater length than the first minor surface, each of the first and second major surfaces extends between corresponding first and second ends of the first and second minor surfaces, respectively, and the second major surface defines low-friction film securing grooves extending from a plane of the second major surface into the elongate body.

In accordance with additional or alternative embodiments, the forming includes a forming of the elongate body by at least one of casting and printing.

In accordance with additional or alternative embodiments, the forming includes a forming of the low-friction film securing grooves by machining.

In accordance with additional or alternative embodiments, the method includes at least one of injection molding, compression molding, hot melting, and net-shaping of a low-friction film supportable by the low-friction film securing grooves at the second major surface.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 5 is a schematic illustration of a major surface of the elevator brake wedge of FIG. 4 in accordance with embodiments;

FIG. 6 is a schematic illustration of a side of the elevator brake wedge of FIG. 4 in accordance with embodiments;

FIG. 7 is a schematic illustration of a side of an elevator brake wedge with a low-friction film in accordance with further embodiments;

FIG. 8 is a schematic illustration of a side of an elevator brake wedge with a low-friction film in accordance with further embodiments.

DETAILED DESCRIPTION

As will be described below, an elevator brake and an elevator brake wedge are provided and do not rely on adhesion to keep low friction materials in place. Instead, the elevator brake and the elevator brake wedge make use of inherent compression forces generated from safety gear engagement to isolate the low friction surfaces. This is achieved by forming grooves in the backsides of elevator brake safety wedges and by pressing or injecting low friction material into the grooves to form pads or films that can be replaced as needed. When the elevator brake safety wedges are engaged, the compression forces press the low friction film into the grooves and thus keep the low friction film stationary while allowing the elevator brake safety wedges to move into place as required for safety engagement and disengagement.

Figure 1:
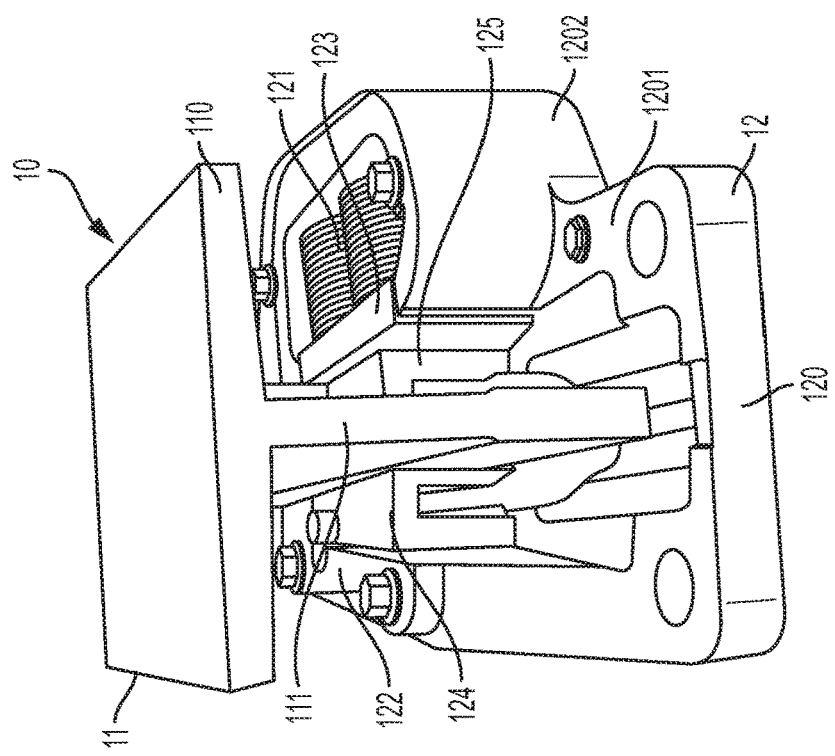
FIG. 1 is a perspective view of an elevator brake with braking wedges in non-braking positions in accordance with embodiments.
Figure 2:
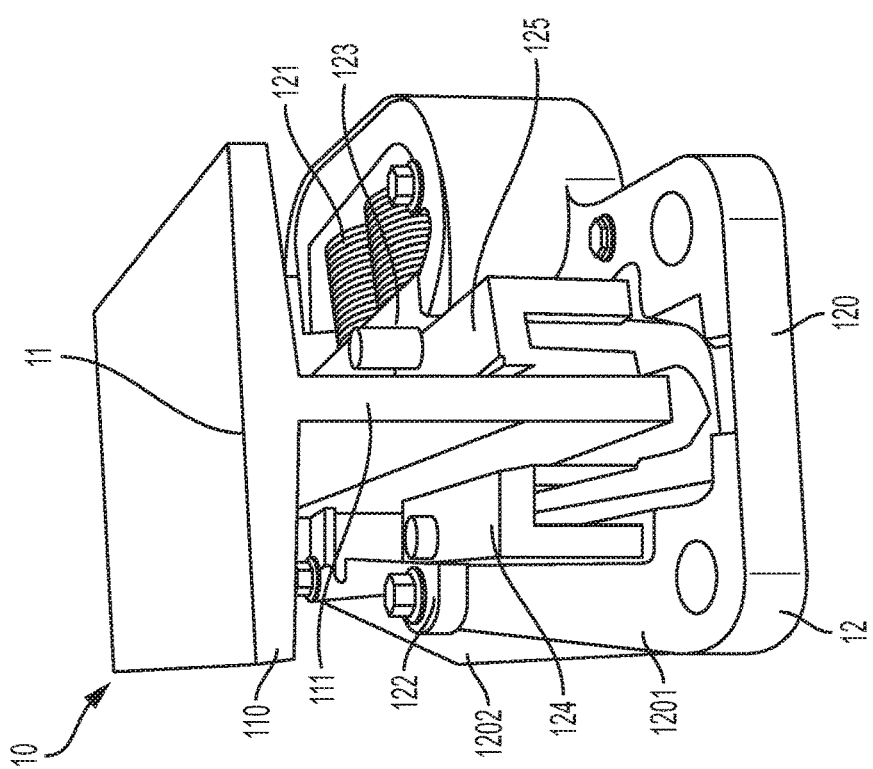
FIG. 2 is a perspective view of an elevator brake with braking wedges in braking positions in accordance with embodiments.
Figure 3:
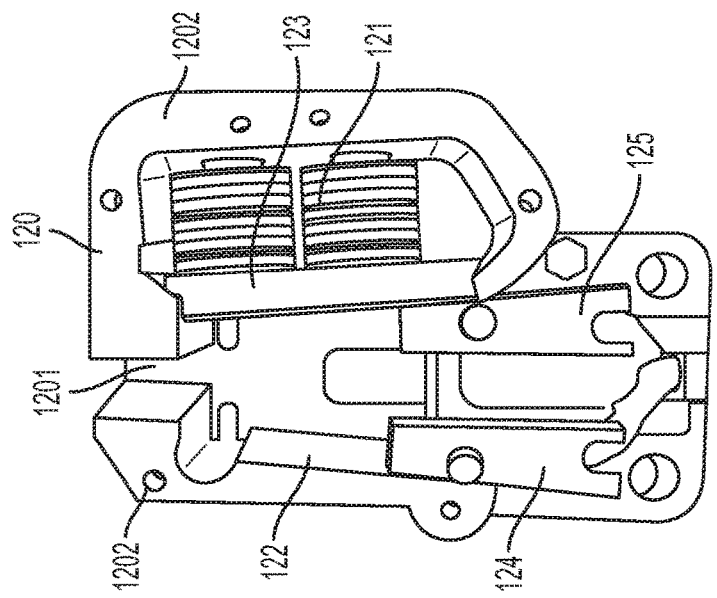
FIG. 3 is a top-down view of the elevator brake of FIGS. 1 and 2.

With reference to FIGS. 1-3, an elevator brake 10 is provided. The elevator brake includes a guide rail 11 and a brake element 12. The guide rail 11 has a cross beam 110 and a main beam 111 extending normally from a central portion of the cross beam 110. The brake element 12 is configured to be capable of self-engagement and disengagement with respect to opposite sides of the main beam 111 of the guide rail 11. The brake element 12 thus includes a support structure body 120, which is formed to define a track along which the main beam 111 can travel, an actuator 121, first and second sliding guides 122 and 123, first and second safety brake wedges 124 and 125.

As shown in FIGS. 1-3, the support structure body 120 includes a base part 1201 and sidewalls 1202 extending from opposite sides of the base part 1201. The base part 1201 is generally tapered along a longitudinal axis thereof such that the sidewalls 1202 correspondingly taper toward each other. The first and second sliding guides 122 and 123 are supportively disposed along the sidewalls 1202 on either side of the guide rail 11, respectively, and are thus tapered toward each other at a same angle as the sidewalls 1202. The first and second sliding guides 122 and 123 may be formed, for example, of metallic materials or metallic alloys. The first and second safety brake wedges 124 and 125 are partially controllable by the actuator 121 and configured to assume respective non-braking and braking positions in the support structure body 120 between the sides of the guide rail 11 and the first and second sliding guides 122 and 123, respectively.

The respective non-braking positions of the first and second safety brake wedges 124 and 125 are characterized in that the first and second safety brake wedges 124 and 125 are disposed at or proximate to a wide end of the support structure body 120 whereas the respective braking positions of the first and second safety brake wedges 124 and 125 are characterized in that the first and second safety brake wedges 124 and 125 are disposed at or proximate to a narrow end of the support body. In the respective braking positions, the angling of the first and second sliding guides 122 and 123 in cooperation with the orientation of the surfaces of the first and second safety brake wedges 124 and 125, which will be discussed in greater detail below, force the first and second safety brake wedges 124 and 125 inwardly against the guide rail 11. Such inwardly directed force can generate sufficient friction between the first and second safety brake wedges 124 and 125 and the guide rail 11 to serve as a brake for an elevator.

In operation, the actuator 121 moves the first and second safety brake wedges 124 and 125 from their respective non-braking positions and toward their respective braking positions. Subsequently, once the first and second safety brake wedges 124 and 125 begin to engage with the guide rail 11 and the first and second sliding guides 122 and 123 as they travel towards their respective braking positions, the first and second safety brake wedges 124 and 125 self-engage with the guide rail 11 and the first and second sliding guides 122 and 123.

Figure 4:
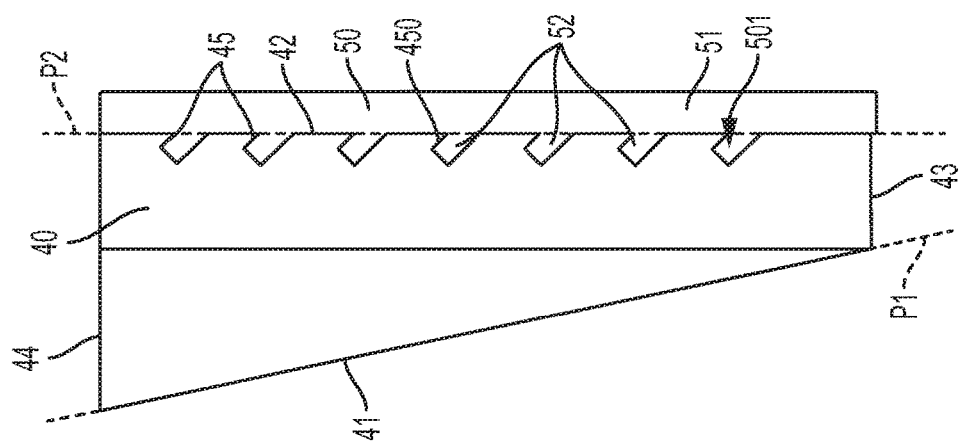
FIG. 4 is a schematic illustration of a side of an elevator brake wedge with a low-friction film in accordance with embodiments.

With reference to FIGS. 4-6, each of the first and second safety brake wedges 124 and 125 includes an elongate body 40. The elongate body 40 has a first major surface 41, a second major surface 42 that is generally opposed to the first major surface 41, a first minor surface 43 and a second minor surface 44 that is generally opposed to the first minor surface 43. The second minor surface 44 has a greater length than the first minor surface 43 and each of the first and second major surfaces 41 and 42 extend between corresponding first and second ends of the first and second minor surfaces 43 and 44, respectively. As such, the first and second major surfaces 41 and 42 taper towards one another with decreasing distance toward the first minor surface 43. The first major surface 41 is substantially planarized and flat for smooth engagement with the corresponding side of the guide rail 11. The second major surface 42 is formed to define low-friction film securing grooves 45. The low-friction film securing grooves 45 extend from a plane P2 of the second major surface 42 into the elongate body 40 and toward a plane P1 of the first major surface 41.

In operative conditions, each of the first and second safety brake wedges 124 and 125 also include a low-friction film 50. The low-friction film 50 is formed to include a film portion 51 and handles 52 protruding from the film portion 51. The handles 52 are receivable in the low-friction film securing grooves 45 such that the low-friction film 50 is supportively disposed at the second major surface 42 for engagement with a corresponding one of the first and second sliding guides 122 and 123.

In accordance with embodiments, the elongate body 40 includes or is formed of metallic materials or metallic alloys. The low-friction film 50 includes or is formed of at least one of thermoplastic and optionally any one or more of filled or unfilled thermoplastic materials, filled or unfilled polymers, filled or unfilled thermoplastics and/or thermoset or epoxy materials with low friction additives. The polymers may include, but are not limited to, fluoropolymers such as polyvinyl ethylene, polyvinylidene fluoride, ethylene tetrafluoro ethyl ene polymers, polyethylene chlorotrifluoroethylene, etc. The fillers may include, but are not limited to, glass, carbon, graphite or other similar materials. In any case, the material(s) of the low-friction film 50 can be inherently difficult to bond to the material(s) of the elongate body 40. Thus, the low-friction film securing grooves 45 are provided to receive the handles 52 such that the low-friction film 50 can be held in place. That is, in accordance with further embodiments, material(s) of the second major surface 42 directly and substantially non-adhesively contact material(s) of the low-friction film 50.

Figure 9:
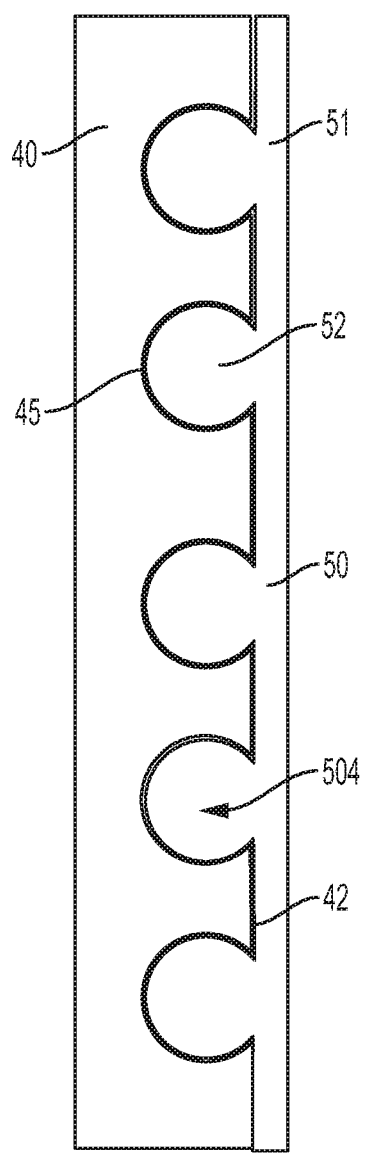
FIG. 9 is a schematic illustration of a side of an elevator brake wedge with a low-friction film in accordance with further embodiments.

As shown in FIGS. 4-6, each of the low-friction film securing grooves 45 may have an elongate cross-sectional shape 501 that traverses an entire depth-wise thickness of the elongate body 40. In such cases, a longitudinal axis of each of the low-friction film securing grooves 45 is acutely angled relative to the plane P2 of the second major surface 42 and a corner 450 of each of the low-friction film securing grooves 45 can be rounded so as to avoid chipping or potential damages to the low-friction film 50. In accordance with further alternative embodiments and, with reference to FIGS. 7, 8 and 9, each of the low-friction film securing grooves 45 may have a V-shape 502 in cross-section (see FIG. 7), a tongue-in-flap shape 503 in cross-section (see FIG. 8) or a ball-in-shoulder shape 505 in cross-section (see FIG. 9).

In any case, the shape and orientation of the low-friction film securing grooves 45 will drive the handles 52 to assume complementary shapes with complementary orientations and will lead to an increase in compression forces being applied to the handles 52 as the first and second safety wedges 124 and 125 are brought into their respective braking positions. This increased compression will in turn lead to the low-friction films 50 being secured in place at the second major surfaces 42 with increasing security and reliability until the respective braking positions are attained and without introducing durability issues typically associated with adhesion bonding.

In accordance with further aspects, a method of forming a safety brake wedge for an elevator is provided. The method includes forming the above-described elongate body 40 to have the first and second generally opposed major surfaces 41 and 42 and to have the first and second generally opposed minor surfaces 43 and 44. The forming is conducted such that the second minor surface 44 has a greater length than the first minor surface 43, such that each of the first and second major surfaces 41 and 42 extends between corresponding first and second ends of the first and second minor surfaces 43 and 44, respectively, and such that the second major surface 42 defines the above-described low-friction film securing grooves 45. In accordance with embodiments, the elongate body 40 may be formed by at least one of casting and printing processes, for example. The forming of the low-friction film securing grooves 45 can be conducted as part of the casting or printing of the elongate body 40 as a whole or by machining once the elongate body 40 is already formed. The above-described low-friction film 50 can be formed, for example, by injection molding, compression molding, hot melting or net-shaping of low-friction film material at the second major surface 42 so that the low-friction film material charges into the low-friction film securing grooves 45 to form the handles 52 while the remainder connects the handles 52 with each other as the film portion 51.

With the configuration and processes described above, minimal if any adhesion is required to secure the low-friction film 50 to the second major surface 42 as the low-friction film 50 will be under compressive forces and be supported by mechanical interlocking features during engagement. That is, pressures applied by the first and second sliding guides 122 and 123 will push the low-friction film 50 into the low-friction film securing grooves 45 and will thus minimize slipping due to shear.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An elevator brake wedge, comprising:
    an elongate body having first and second generally opposed major surfaces and first and second generally opposed minor surfaces,
    the second minor surface having a greater length than the first minor surface,
    each of the first and second major surfaces extending between corresponding first and second ends of the first and second minor surfaces, respectively, and
    the second major surface defining low-friction film securing grooves extending from a plane of the second major surface into the elongate body,
    wherein each of the low-friction film securing grooves has an elongate shape and is elongate in a dimension extending into the elongate body from a plane of the second major surface and comprises:
    an axial end wall defining an end wall plane transversely oriented relative to the plane of the second major surface and comprising opposite first and second end wall ends;
    a major sidewall which is longer than the axial end wall and which extends from the plane of the second major surface to the first end wall end; and
    a minor sidewall which is parallel with and shorter than the major sidewall and which extends from the plane of the second major surface to the second end wall end.

2. The elevator brake wedge according to claim 1, wherein:
    the elongate body comprises metallic materials or metallic alloys, and the low-friction film securing grooves are receptive of low-friction film handles.

3. The elevator brake wedge according to claim 1, wherein a material of the second major surface directly and substantially non-adhesively contacts a material of a low-friction film.

4. An elevator brake, comprising:
first and second sliding guides supportable in a body on either side of a rail;
first and second brake wedges configured to assume respective non-braking and braking positions in the body between the sides of the rail and the first and second sliding guides, respectively,
each of the first and second brake wedges comprising:
a first major surface for engagement with the rail;
a second major surface generally opposite the first major surface and formed to define grooves; and
a single unitary low-friction film comprising contiguous sections and having handles at each of the contiguous sections which are receivable in the grooves to support the low-friction film at the second major surface for engagement with a corresponding one of the first and second sliding guides, wherein:
each of the grooves has an elongate shape and comprises:
an axial end wall defining an end wall plane transversely oriented relative to the plane of the second major surface and comprising opposite first and second end wall ends:
a major sidewall which is longer than the axial end wall and which extends from a plane of the second major surface to the first end wall end; and
a minor sidewall which is parallel with and shorter than the major sidewall and which extends from the plane of the second major surface to the second end wall end,
the single unitary low-friction film comprises a body with a major surface extending continuously along each of the contiguous sections and abutting with the second major surface, and
the handles of each of the contiguous sections are respectively receivable in the grooves to support the single unitary low-friction film at the second major surface for engagement with a corresponding one of the first and second sliding guides, each of the handles being elongate in a direction extending outwardly relative to the body from a plane of the major surface.

5. The elevator brake according to claim 4, wherein:
each of the first and second brake wedges further comprises a first minor surface and a second minor surface generally opposed to and having a greater length than the first minor surface, and
the grooves extend from a plane of the second major surface toward a plane of the first major surface.

6. The elevator brake according to claim 4, wherein:
the first and second brake wedges comprise metallic materials or metallic alloys, and
the low-friction film comprises at least one of filled or unfilled thermoplastic materials, filled or unfilled polymers, filled or unfilled thermoplastics and/or thermoset or epoxy materials with low friction additives.

7. The elevator brake according to claim 4, wherein a material of the second major surface directly and substantially non-adhesively contacts a material of the low-friction film.

\* \* \* \* \*